April 5, 1938.　　A. W. HERRINGTON　　2,113,545
TRACTOR
Filed Sept. 9, 1935　　3 Sheets-Sheet 3
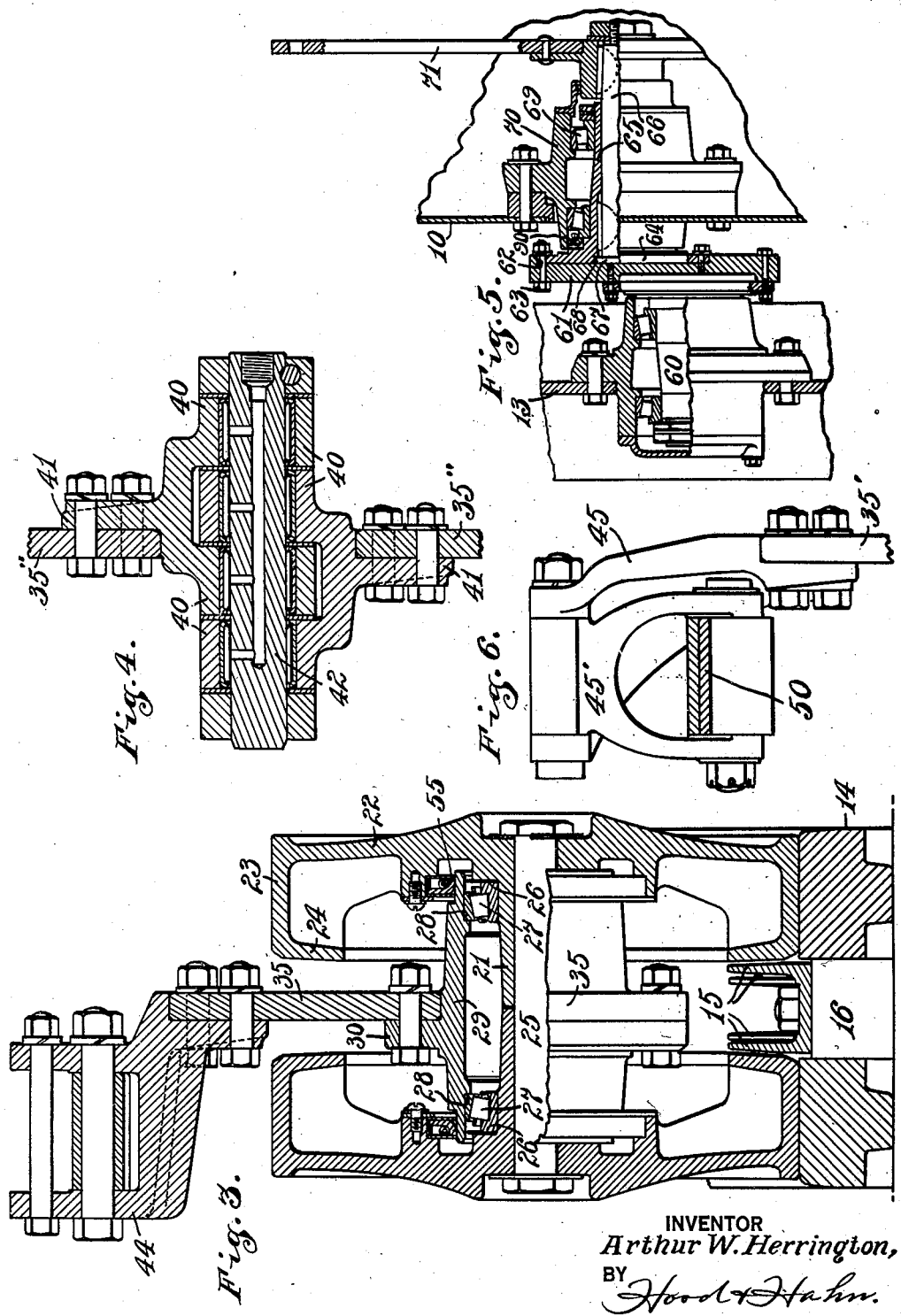
INVENTOR
*Arthur W. Herrington,*
BY
*Hood & Hahn.*
ATTORNEYS Patented Apr. 5, 1938

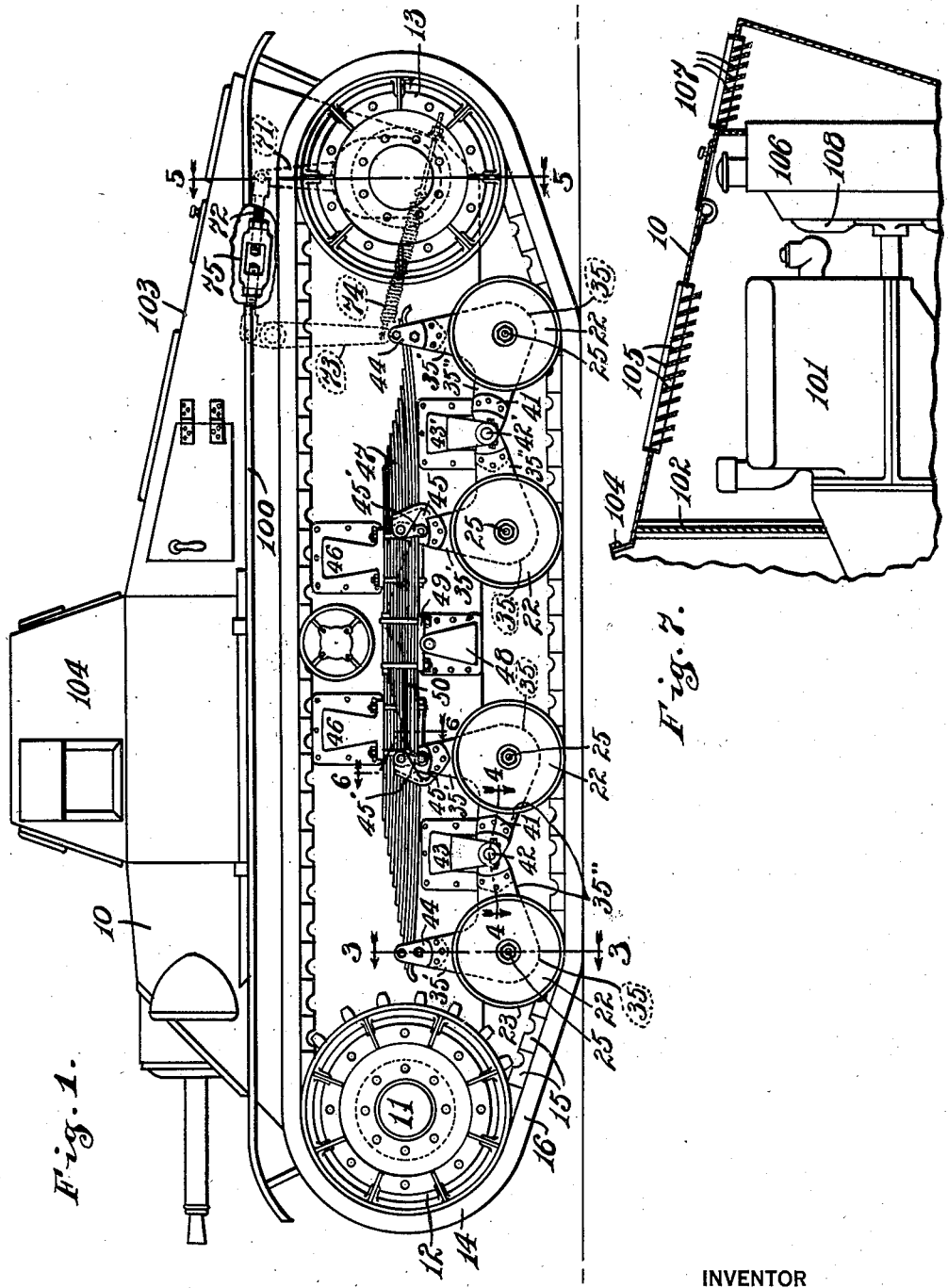

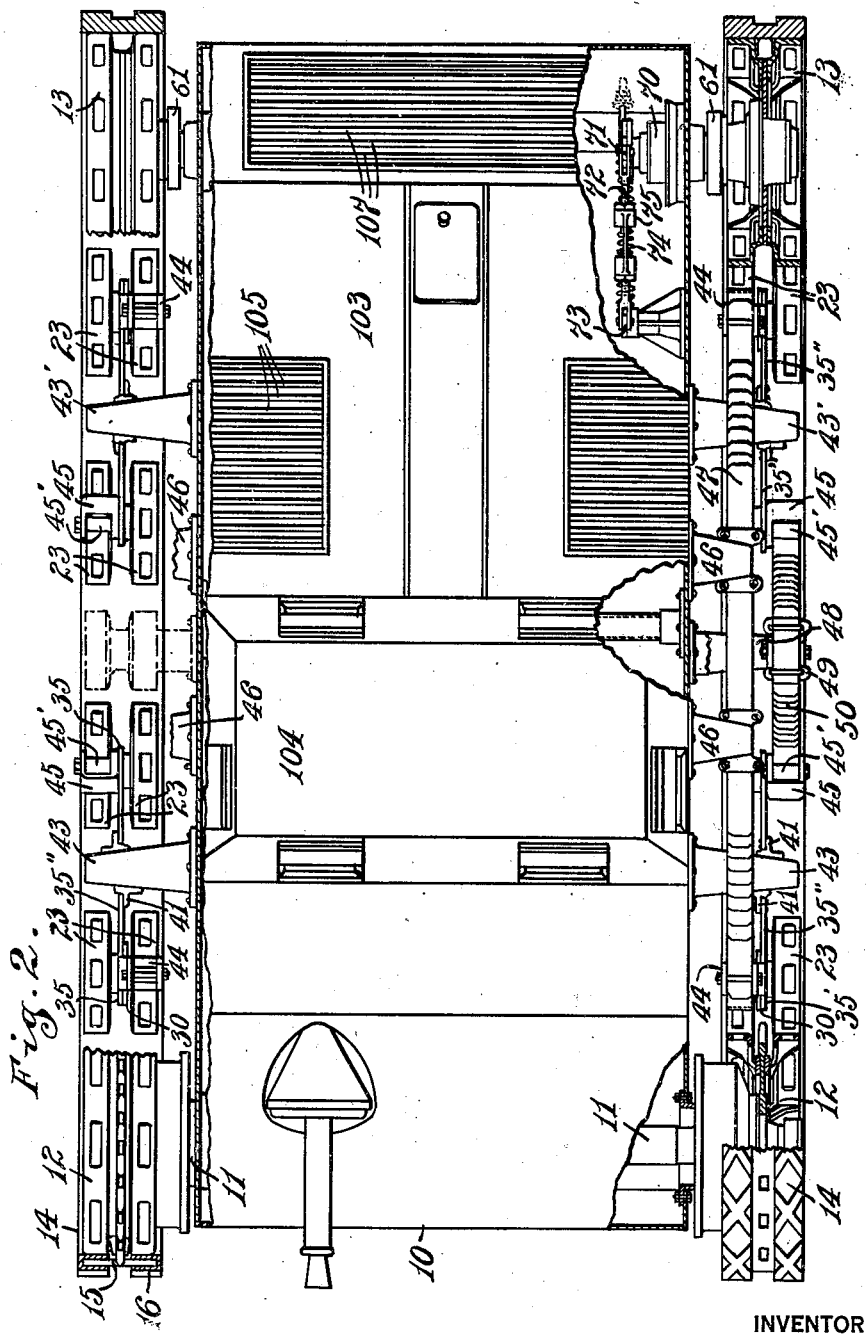

2,113,545

UNITED STATES PATENT OFFICE 2,113,545

TRACTOR

Arthur W. Herrington, Indianapolis, Ind., assignor to Marmon-Herrington Company, Inc., Indianapolis, Ind., a corporation of Indiana Application September 9, 1935, Serial No. 39,779

9 Claims. (Cl. 305—9)

One object of my invention is to provide improved means, in a motor vehicle of the endless traction-belt type, for associating the traction belts with the main body of the vehicle, in such manner that the riding qualities will be improved and lighter body construction may be adopted without sacrifice of strength or safety.

Another object of my invention is to provide improved track-belt mounting which will yield improved results in soft terrain.

Another object of my invention is to provide an improved combat structure which will be semi-aquatic.

Other objects of my invention will appear from the following specification.

The accompanying drawings illustrate my invention as embodied in a combat unit.

Fig. 1 is a side elevation;

Fig. 2 is a plan in fragmentary horizontal section;

Fig. 3 is a section, on a larger scale, on line 3—3 of Fig. 1;

Fig. 4 is a section, on the scale of Fig. 3, on line 4—4 of Fig. 1;

Fig. 5 is an axial section, on line 5—5 of Fig. 1 but on a larger scale;

Fig. 6 is a section on the line 6—6 of Fig. 1; and

Fig. 7 is a fragmentary medial longitudinal vertical section of the main body in the motor region.

In the drawings 10 indicates the hull-like main body in the forward end of which is mounted a driving-axle structure 11 of known form and comprising driving sprocket wheels 12, 12 one at each side of the hull. At the rear end of the hull, in the longitudinal plane of each driving sprocket 12, is a take-up wheel 13 which may be journalled on the hull in any desired manner but which I prefer to mount in a special manner to be hereinafter described.

Running over each sprocket wheel 12 and its companion wheel 13, is an endless track belt 14 of well known form comprising medial metal links 15 associated with an endless rubber tread 16.

Between wheels 12 and 13 on the lower run of the traction belt are four load-carrying idler units about equally spaced and approximately symmetrical as to the middle of the length of the hull. Each idler unit comprises a pair of idler wheels, each comprising a tubular hub 21 and disk 22, peripheral track-engaging rim 23 and internal flange 24. The two wheels are firmly united by a bolt 25 passing through the tubular hubs, said hubs having such length, relative to flanges 24, as to axially space said flanges, as clearly shown in Fig. 3. Each hub 21 is shouldered at 26 to receive the inner ring of a roller bearing 27, the outer ring of which seats in an outwardly-faced pocket 28 formed in the end of a bearing sleeve 29 provided with an external flange 30 set in a plane somewhat to one side of the medial transverse plane of the sleeve, for a reason which will appear. Sleeved over the long end of sleeve 29 is a heel of a bell-crank plate 35, having a substantially vertical arm 35' and a nearly horizontal arm 35". Flange 30 is so placed that plate 35 is arranged in the medial plane of the track belt and medially between the two units of the idler and the width of the track belt is equal to or slightly greater than the overall axial extent of the idler.

Secured to the free end of each arm 35" is a hinge bracket comprising a pair of axially spaced eyes 40, 40 and an intermediate radially projecting arm 41 so placed that, when two such brackets are relatively reversed and the eyes interdigitated, as shown in Fig. 4, the radial faces of arms 41 may be bolted respectively to opposite faces of alined oppositely extending arms 35".

The bell-crank plates 35 are set at each side of the hull in two pairs, as shown in Fig. 1, and hinged respectively on a forward pintle 42 and aft pintle 42' which pass through the eyes 40. The two pintles are carried respectively by forward and aft brackets 43, 43' anchored on the side plates of the hull symmetrically placed relative to the medial transverse plane of the hull.

Attached to the inner faces of the ends of the forward and aft arms 35' are brackets 44. Attached to the outer faces of the ends of arms 35' of the intermediate plates are shackle brackets 45, each provided with a shackle link 45'.

Two pad brackets 46, 46, symmetrically placed relative to the transverse medial plane of the hull, are anchored on the hull; and anchored on these brackets, closely paralleling the side plates of the hull, is a long leaf spring 47 the opposite ends of which are seated on the forward and aft brackets 44.

Projecting from the hull below but medially between the brackets 46 is a pintle bracket 48 upon which is pivoted a spring pad 49 to which is secured a short leaf spring 50, the opposite ends of which are connected to the two shackle links 45'.

It will be noted that, as plates 35 lie between the two wheel elements of each idler, there are no parts overhanging beyond the width of the track belt so that, as ruts are cut in soft ground, there are no overhanging parts to drag in the sides of the ruts, and, as there are no supporting parts overlying the ends of the idlers, the possibility of mud caking against the ends of the idlers is eliminated.

The peripheral faces of the idlers must, of course, straddle the metal links 15 of the track belt and mud may get into the space between the two parts of the idler but, as the plate 35 is non-rotative, it serves to prevent caking.

Each of the wheel units of the idler is provided with a grease packing 55 into which the adjacent end of sleeve 29 fits closely so that the interior of sleeve 29 and the bearings 27 may be easily kept packed with grease.

As will be clearly seen, the suspension of the various idler units is broadly of the type which has come to be known as independent springing. That is, the forward and aft idlers may be displaced upwardly or downwardly without affecting each other or the intermediate idlers; while either one of the intermediate idlers may be displaced upwardly or downwardly without affecting the forward or aft idlers. It will be clear that the spring 47 is the equivalent of two separate springs; but that a single long spring has been used in place of two separate springs in order to reduce the degree of torque applied to the hull plates. That is, the effect of using a single long spring is substantially equivalent to the effect which would be obtained by using two springs, each supported at its free end upon one of the arms 35', anchored intermediate its ends upon the adjacent pad bracket 46, and anchored at its opposite end on the remote pad bracket 46.

Upward displacement of either end of the intermediate idlers serves, through the rocking spring 50, to correspondingly increase the downward pressure on the companion intermediate idler.

In practice it has been found that the described arrangement of spring mounting for the idlers provides unexpectedly smooth and stable riding qualities free from the "rocking horse" gambols commonly experienced in driving vehicles of this type at relatively high speeds over rough terrain.

The take-up wheel 13 is journalled upon a pin 60 (Fig. 5) bolted eccentrically on the outer face of a plate 61 which, on its opposite face is provided with a circular pocket 62 eccentric to the axis of pin 60. Held in pocket 62 by bolts 63 is the circular head 64 of a hub, or sleeve 65, the axis of which is parallel with and adjustably eccentric to the axis of pin 60.

Sleeve 65 is splined upon a pin 66 which is provided with a head 67 seated in a pocket 68 in the end of sleeve 65 adjacent plate 61. Sleeve 65 is supported by bearings 69 in a sleeve 70 bolted upon the inner face of the side plate of hull 10. Splined on the inner end of pin 66 is a lever 71 connected by a link 72 with the short arm of a lever 73 (Fig. 1) pivoted upon the inner face of the side plate of the hull. The long arm of lever 73 is connected by a tension spring 74 to a suitable anchorage within the hull. Link 72 is adjustable in length by means of a medial turnbuckle 75.

It will be noted that in this construction the position of the axis of pin 60 relative to the length of the track belt is varied, with variations in the effective length of said belt, by mechanism which is within the hull and therefore effectively protected against injury by gun fire or collision.

It will also be noted that the angular relation of eccentricity of pin 60 relative to the axis of sleeve 65 may be adjusted by rotating head 64 in its pocket 62, so that considerable variation in length of the track belt may be readily compensated in the field without materially changing the general range of movement of arm 71. The bearings for the driving sprockets 12 and the take-up sprockets are watertight, by reason of the oil seal 90 (Fig. 5) for a reason which will appear.

The two arms of the bell-crank plates are identical, the hinge brackets are identical, the shackle brackets are identical and arms 41 of the hinge brackets, the shackle brackets, and the ends of the two arms of the bell-crank plates are similarly perforated for clamping bolts. This construction materially cheapens production and facilitates assembly and replacement. A single set of replacement parts, i. e., one bell-crank plate, one hinge bracket and one shackle bracket, will be sufficient to repair damage at any one of the eight idler units, so that such a set of replacement parts may be readily carried into combat.

The hull is water-tight up to the level of the boards 100, or thereabouts, well above the level of the axes of sprockets 12 and wheels 13 and the motor 101 is placed in the stern of the hull aft of the bulkhead 102.

The stern deck 103 of the hull, closely aft of the conning tower 104 is provided with inlet louvres 105, and aft of the radiator 106, with outlet louvres 107. The radiator 106 is spaced aft of the motor and between them is the fan 108 capable of creating a suction through louvres 105 and a pressure through louvres 107. Under movement tower 104 creates a slight vacuum immediately aft which stimulates flow of air into louvres 105.

By this arrangement, I have been able to successfully cool the motor to such an extent that the bulkhead 102 does not become heated enough to be uncomfortable to touch and as a consequence, the operators are not only more comfortable but are guarded against burns.

Attention is particularly called to the fact that the weight of the vehicle is supported upon four pairs of individually-hinged, separately sprung, metal, non-tired wheels which, in turn, rest upon a continuous, one-piece, non-jointed rubber belt. This arrangement eliminates vibration, common to so many tractor structures, resulting from the movement of the load-supporting wheels across the junctures of the blocks of a jointed belt; and the construction as a whole makes, as has been said, for easy riding of the vehicle.

I claim as my invention:

1. In a motor vehicle of the endless-tread type, the combination with a main body, driving wheel, a take-up wheel, and an endless track enclosing said wheels, of a series of four load-carrying idlers contacting the intermediate portion of the lower run of said track at spaced intervals, anchorages for said idlers on the main body permitting individual vertical movement of each idler relative to the main body, an anchor bracket carried by the main body midway between the middle two idlers, a bracket hinged on said anchor bracket on a horizontal axis transverse to the main body, spring means interposed between said second mentioned bracket and each of said middle two idlers whereby upward displacement of either of said idlers stresses said spring means and applies a downward force upon the other idler, and spring means interposed between each of the end idlers and the main body and anchored on the main body between the transverse vertical planes of said end idlers and the medial transverse plane of the main body.

2. In a motor vehicle of the endless-tread type, the combination with a main body, driving wheel, a take up wheel and an endless-track enclosing said wheels, of a series of four load-carrying idlers contacting the intermediate portion of the lower run of said tread at spaced intervals, a leaf spring rockably anchored upon the main body on a transverse axis midway between the transverse vertical planes of the two middle idlers with its opposite ends connected to said idlers, and a second leaf spring anchored on the main body midway between the two end idlers with its opposite ends connected to said end idlers.

3. In a motor vehicle of the endless tread type, the combination with a main body, an endless-tread belt and primary supporting and driving means for said belt, of two pintle pins anchored on the main body overlying the lower run of the belt and spaced longitudinally of the belt, two pairs of bell-crank plates each having a journal bearing at its apex, a hinge element secured to one arm and hinged upon a pintle, and a spring seat secured to the other arm, the hinge-elements and spring seats being reversely arranged relative to companion plates and the plates reversely arranged in pairs relative to a pintle, and spring means anchored on the main body and engaging the spring seats, and a wheel unit journalled in each journal bearing and bearing upon the lower run of the belt, each wheel unit comprising two axially spaced wheels lying upon opposite sides of one of said plates.

4. In a motor vehicle of the endless tread type the combination with a main body, an endless-tread belt and primary supporting and driving means for said belt, of two pintle pins anchored on the main body overlying the lower run of the belt and spaced longitudinally of the belt, two pairs of bell-crank plates each having a journal bearing at its apex, a hinge element secured to one arm and hinged upon a pintle, and a spring seat secured to the other arm, the hinge-elements and spring seats being reversely arranged relative to companion plates and the plates reversely arranged in pairs relative to a pintle, a leaf spring anchored on the main body with its opposite ends connected respectively with the spring seats of the two end wheel units and a second leaf spring pivotally anchored upon the main body midway between the two middle wheel units with its opposite ends connected respectively with the spring seats of the two middle wheel units.

5. In a motor vehicle of the endless-tread type, a carrier for a load-carrying idler, comprising a bell-crank plate, a journal bearing at the apex of said plate with its axis transverse to the plane of the plate, a spring seat reversely attachable to either face of one arm and a hinge element reversely attachable to either face of the other arm, the hinge element being matable with an identical but reversely-arranged hinge element of a similar unit upon a common axis.

6. In a motor vehicle of the endless-tread type, the combination with a main body, an endless-tread belt and primary supporting and driving means for said belt, of a series of four load-carrying idlers contacting the intermediate portion of the lower run of said belt at spaced intervals, the two forward of said idlers contacting the belt forward of the transverse medial plane of the main body and the two rearward of said idlers contacting the belt to the rear of said transverse plane, a carrier for each of said two forward idlers each pivotally anchored on the main body between the axes of said forward idlers, a carrier for each of said two rearward idlers each pivotally anchored on the main body between the axes of said rearward idlers, a spring abutment for carrier of the most forward idler anchored on the main body to the rear of the axis of said idler, a spring abutment for the carrier of the rearmost idler anchored on the main body forward of the axis of said rearmost idler, a spring abutment for the carrier of the forward intermediate idler anchored on the main body to the rear of the axis of said idler, and a spring abutment for the rearward intermediate idler anchored on the main body forward of the axis of said idler.

7. In a motor vehicle of the endless-tread type, the combination with a main body, an endless-tread belt and primary supporting and driving means for said belt, of a series of four load-carrying idlers contacting the intermediate portion of the lower run of said belt at spaced intervals, the two forward of said idlers contacting the belt forward of the transverse medial plane of the main body and the two rearward of said idlers contacting the belt to the rear of said transverse plane, a carrier for each of said two forward idlers each pivotally anchored on the main body between the axes of said forward idlers, a carrier for each of said two rearward idlers each pivotally anchored on the main body between the axes of said rearward idlers, a spring abutment for carrier of the most forward idler anchored on the main body to the rear of the axis of said idler, a spring abutment for the carrier of the rearmost idler anchored on the main body forward of the axis of said rearmost idler, a spring abutment for the carrier of the forward intermediate idler, a spring abutment for the carrier of the rearward intermediate idler, and an anchorage for the spring abutments of the two intermediate idlers pivotally anchored on the main body between the axes of said intermediate idlers.

8. In a motor vehicle of the endless-tread type, the combination with a main body, an endless-tread belt and primary supporting and driving means for said belt, of a load-carrying idler group comprising two pairs of co-axial axially spaced idler wheels, a bearing structure for each pair of idler wheels each arranged between the wheels, a pair of identical carrier plates each attached to one of said bearing structures and each projecting radially beyond the peripheries of its adjacent wheel, two identical interdigitable hinge elements respectively attached to said plates in reversed relation to said plates and to each other and pivotally associated with each other, two identical spring-seat elements respectively attached to said plates in reversed relation to said plates, springs anchored on said main body and respectively engaging said spring-seat elements.

9. An idler unit for endless traction tracks for motor vehicles, comprising a tubular bearing hub, provided with an external flange laterally offset relative to the transverse medial plane of the hub, a pair of idler wheels rotatively carried by said hub at its opposite ends, a hanger plate perforated to receive said hub and having opposite faces adjacent such perforation for application to said hub flange, fastening means connecting said hanger plate and hub flange, and separable and reversible hinge and spring-seating fittings applicable to either face of said plate beyond the peripheries of the idler wheels.

ARTHUR W. HERRINGTON.